Nov. 22, 1932. J. J. HERLBAUER ET AL 1,888,665
WINDSHIELD WIPER
Filed May 8, 1929
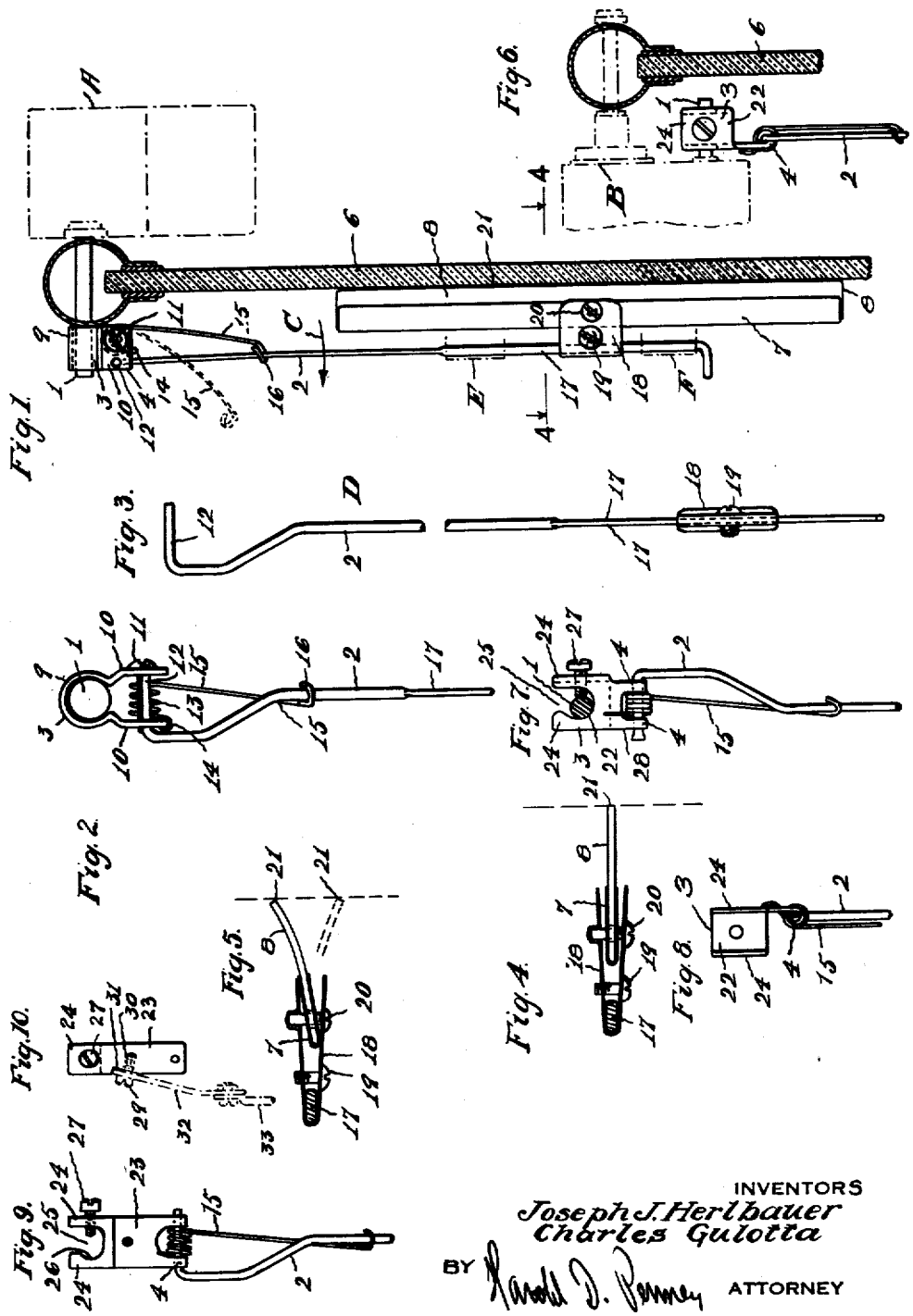
INVENTORS
Joseph J. Herlbauer
Charles Gulotta
BY
ATTORNEY Patented Nov. 22, 1932

1,888,665

UNITED STATES PATENT OFFICE

JOSEPH J. HERLBAUER, OF HOLLIS, AND CHARLES GULOTTA, OF NEW YORK, N. Y.

WINDSHIELD WIPER

Application filed May 8, 1929. Serial No. 361,450.

Our present invention relates to automatic wipers for automobile windshields and analogous devices, and one of the objects is to improve the wiper blade or squeegee portion of such wipers.

Another object of our invention is to improve the surface wiper or squeegee so that it may be readily utilized to replace those that have been worn out or damaged, and involves the provision of a universal attaching means upon the wiper assembly whereby it may be quickly attached to any type of automatic or hand-operated wiper for windows, windshields and the like.

There are many kinds of wipers on the market and while they vary in dimensional details they are generally similar as to structural features as they all have an oscillating shaft, usually mounted in a bearing associated with the windshield frame, which serves as a means for mounting the vibrating wiper arm and wiper. Our improvement permits the attachment of our universal wiper and wiper arm assembly to any shaft in perfect operative assembly.

Another object of our invention is to improve the wiper assembly generally, as will be disclosed hereinafter in detail, whereby the wiper tension means is simplified in structure, made easy to set up, will require no later adjustment and is economical to manufacture.

Another object of our improvement relates to the means for positioning the wiper blade so that it may be adjusted to sweep a path for permitting clear vision at a position upon the glass of the windshield at or near the level of the eyes of the driver.

Another object of our improvement relates to a means for mounting the squeegee in a manner which will permit it to oscillate so as to present one or the opposite edge of the rubber scraper to the glass.

Other objects will be apparent from the description herein, and it is obvious that modifications may be made in the structure herein disclosed without departing from the scope thereof or the spirit of the appended claims.

In the accompanying drawing:

Fig. 1 is a fragmentary sectional view of a characteristic windshield structure with our device applied in one form.

Fig. 2 is an enlarged fragmented side view of the embodiment shown, in Fig. 1 looking from left to right in Fig. 1.

Fig. 3 is an enlarged view of the wiper arm.

Fig. 4 is an enlarged sectional view of the wiper and wiper clamp, which are hereinafter described taken on the line 4—4 of Fig. 1, looking in the direction of the arrows.

Fig. 5 is a view similar to Fig. 4 with the wiper in operative position.

Fig. 6 is a side view of a modified form of a shaft clamp and wiper arm similar to Fig. 7 and looking from right to left in Fig. 7 showing a different type of motor mounting than in Fig. 1.

Fig. 7 is an end view of a drive shaft having a form of wiper arm and shaft attaching means which are different than in Fig. 1 and similar to Fig. 6.

Fig. 8 is a side view thereof looking from left to right in Fig. 7.

Fig. 9 is a fragmentary front view with relation to the windshield and an end view with relation to the shaft of a similar wiper arm attaching means of the preferred form.

Fig. 10 is a side view thereof looking from left to right in Fig. 9.

It is well known that wiping devices of the herein kind become impaired and the wiper blade or squeegee, which is of rubber, gradually disintegrates and requires replacement. Various types of hand or motor driven arrangements are used to operate the wiper arm and appurtenant parts. Two characteristic variants of the motor mounting for this purpose are shown at A and B, Figs. 1 and 6. In every operative arrangement, however, whether motor or hand operated, these devices are all provided with a shaft 1 upon which is attached the wiper attachment as disclosed. Such shafts are of varying length and diameter and to renew or replace the wiper arm assembly of any particular make of wiper apparatus would require a large stock of wiper arms to cover the various makes. We have designed a type of wiper arm replacement assembly which is simple, economical and adaptable universally to all kinds of windshield wipers.

To this latter end, we have provided the wiper arm 2 with a shaft affixing clamping bearing 3 which provides a means whereby to adjustably and rigidly mount a wiper arm assembly to the motive shaft 1, regardless of limited variations in such shaft dimensions, and which also carries a pivotal connection 4 for permitting said wiper arm 2 to be swung away from the plane of the glass 6, Fig. 1, in the direction of the arrow C.

The clamping bearing 3 provides means for mounting a wiper arm tension means 15 which is hereinafter described; it tends to keep the wiper arm 2 pressed towards the glass 6, at all times, under a resilient tension. Thus, when the wiper blade assembly, comprising a metal ferrule 7 and its enclosed rubber wiper blade 8, of usual construction, is in operative position upon the arm, as in Fig. 1, the blade is resiliently held in wiping contact upon the surface of glass 6.

The clamping bearing 3 is shown in three modified forms, all possessing the identical functions and advantages herein disclosed but being structurally varied from each other. In Figs. 1 and 2 the bearing is shown of bent sheet metal construction having a cylindrical shaft embracing portion 9 with downstanding opposing ear lugs 10 thereon, these being bored and tapped to receive therein a slot-headed machine screw 11. The cylindrical portion 9 is initially of sufficiently large diameter to permit it to engage and be clamped upon a maximum sized motive shaft 1, or to be drawn down and be clamped upon any minimum sized motive shaft.

In Figs. 1 and 2, the clamping bearing 3 is also shown as being provided with means thereon to pivotally support the wiper arm 2. To this end the lugs 10 are bored at 4 to pivotally receive therein the right angled bent pivot or swivel extension 12, Figs. 1, 2 and 3, which is formed by bending the upper end of the wiper arm 2, as shown. In bending the extension 12, Fig. 3, the longitudinal offset positioning of the extension leaves the lower straight portion D of the arm 2 in substantially central position thereto.

When the swivel extension 12 is assembled to the bearing 3, as noted, a coiled wire spring 13 having a fulcrum hook 14 which is caught against one of the lugs 10 has its other free or tension end elongated into a hooked pressure extension 15, the hooked end 16 of which is releasably and slidably engaged over the wiper arm 2, Figs. 1 and 2, thus to keep the wiper arm in operative swivel position in the lugs 10 and to keep the wiper arm and its appurtenant wiper blade 8 resiliently pressed against the glass 6 at all times.

The lower end of the wiper arm 2, normally of round wire, is flattened as at 17 on both sides, best shown enlarged and in section, Fig. 5, so as to form a riding feather or key portion upon which to adjustably support, in any locked position within its limits of movement, a lockable wiper clamp 18 which is made of a comparatively narrow strip of metal bent in U-shape and provided with a clamp screw 19 to draw the clamp portions together to lock the wiper clamp 18 in desired adjusted positions E—F, shown in dotted lines on the arm 2, Fig. 1. The clamp portions are further provided with a pivot screw 20 whereby to removably support the metal backed wiper blade 8, the blade being loosely swivelled thereon and loosely held between the arms of the wiper clamp 18, as illustrated in Fig. 5, to permit the blade 8 to have limited angular movement whereby to alternately present edges 21 to the glass for cleaning purposes in opposition to and during the cleaner stroke movements to and fro. A midposition between strokes is illustrated in Fig. 4 and clearly shows the clearances between the wiper blade and clamp.

In Figs. 6 to 10 inclusive is shown a further modified form of clamping bearing and two similar types of quickly attachable shaft bearings are shown. The modifications, however, consist, as in Figs. 6, 7 and 8, in making the shaft clamping bearing 22 of a sheet metal stamping whereas in Figs. 9 and 10 the clamping bearing is made of a solid cast or machined block 23.

The means for clamping the bearing to the shaft 1 is similar in both instances and comprises a pair of upstanding opposed lugs 24 which are parallel to the shaft in the modification shown in Figs. 9 and 10 and perpendicular thereto in the modification shown in Figs. 6, 7 and 8; in the latter form said lugs have each therein an opening made by cutting a slot 25 therein transversely thereto, and in Figs. 7 and 9, the said opening is positioned between said lugs and parallel thereto a circular shaft seat 26 is formed in one of said lugs 24. In the opposite lug is located a threaded screw 27 which, when all is assembled, as in Fig. 7, the screw 27 forces the shaft 1 into the seat 26 and locks the shaft and bearing together. The dimensions of the opening 25 and the seat 26 are large enough to accommodate a maximum sized shaft 1 and also automatically, upon locking, center and grip a minimum sized shaft 1.

In Fig. 10 there is shown an offset lever 32, in dotted lines. This lever is diagonally attached to bearing block 23 by screw 29, also shown dotted, which enters hole 30. The block 23 has a diagonal face cut 31, to form an angled stop seat for lever 32. To this lever is pivotally attached a connecting link 33, shown in dotted lines. This link 33 may pivotally connect two or more bearing blocks on wiper devices spaced across a windshield with only one wiper mechanism to operate the same.

The modification shown in Figs. 6, 7 and 8 discloses the bent up sheet metal embodiment in which, as in Fig. 8, the structure is shown with the lugs 24 which are bent in the form of two outstanding ears, in which ears are located the shaft gripping spaces 25 and one of the lugs 24, as in Fig. 7, mounts the pressure screw 27 for forcing the drive shaft 1 into rigid driving contact therewith, as previously described.

It will therefore be noted that we have devised a windshield wiper assembly including the arm and attaching bearing bracket for replacement which is sufficiently universal in the bearing bracket attaching means to permit it to be affixed to standard shafts of wiper mechanisms, regardless of the bearing diameters thereof.

What we claim is:

1. In a wiper assembly for automobile shields comprising a shaft and an arm, which later is provided with an angularly disposed terminal extension, a resilient clamp carrying said arm and adjustably mounted on said shaft, said clamp having a body portion disposed in engagement with said shaft, spring constructed spaced ears projecting from said portion and having therein opposed apertures, said extension being positioned in said apertures, said ears having also therein a bore and an opposed tapped bore, a screw turnably mounted in said bore and threadedly engaged in said tapped bore for moving said ears whereby to adjust the engagement of said body portion on said shaft, a wiper carried by the other terminal of said arm, and spring means mounted on said screw and engaging said arm to urge said wiper against a shield to be wiped.

2. A vehicle shield wiping mechanism including in combination a shaft and an arm, said arm having a plain right angularly disposed terminal extension, a resilient clamp carrying said arm and adjustably mounted on said shaft, said clamp having an arcuate body portion adjustably mounted on said shaft, parallel spaced spring constructed ears projecting from said portion and having therein opposed apertures, said extension being positioned in said apertures, said ears having also therein a bore and an opposed tapped bore, a screw turnably mounted in said bore and threadedly engaged in said tapped bore for moving said ears whereby to adjust said body portion on said shaft, a wiper carried by the other terminal of said arm, and spring means mounted on said screw and engaging said arm to urge the wiper against a shield to be wiped.

3. In a vehicle shield wiping mechanism comprising a turnable shaft and a swingable shield wiper, a bearing clamp carried by said shaft and having two opposed pairs of apertures therein, an arm carrying at one of its ends said wiper and having at its opposite end a plain angularly disposed extension, said extension being loosely positioned in one pair of said apertures and said first being disposed in parallel relation with the shield to be wiped, means for urging said wiper against a shield, said means including a pin in the other pair of said apertures, a torsion spring mounted on said pin and having one of its terminals rigid with said clamp, the other end of said spring being engaged in urging relation with said arm.

4. A vehicle shield wiping mechanism comprising in combination with a turnable clamp and a wiper, the latter being swingable on turning movement of the clamp, a rod of round cross section carried at one of its ends on said clamp, another clamp embracing said wiper and having spaced adjustable arms, means for adjusting the position of said arms, and a flat terminal on the other end of said rod and positioned between said said arms for adjustably carrying said wiper.

Signed at New York in the county of New York and State of New York this 7th day of May A. D. 1929.

JOSEPH J. HERLBAUER.
CHARLES GULOTTA.